United States Patent [19]
Abe et al.

[11] Patent Number: 5,640,065
[45] Date of Patent: Jun. 17, 1997

[54] ULTRASONIC MOTOR AND METHOD OF DRIVING THE SAME

[75] Inventors: Chikara Abe; Yuichiro Matsuo, both of Hachioji, Japan

[73] Assignee: Olympus Optical Co., Ltd., Tokyo, Japan

[21] Appl. No.: 559,711

[22] Filed: Nov. 15, 1995

[30] Foreign Application Priority Data

Nov. 18, 1994 [JP] Japan .................................. 6-285483
Nov. 14, 1995 [JP] Japan .................................. 7-295121

[51] Int. Cl.⁶ .................................................. H01L 41/08
[52] U.S. Cl. ............................ 310/317; 310/316; 310/323
[58] Field of Search ........................... 310/316, 317, 310/319, 323, 328; 318/116

[56] References Cited

U.S. PATENT DOCUMENTS 5,416,375  5/1995  Funakubo et al. ...................... 310/323
5,453,653  9/1995  Zumeris ................................. 310/317 X

FOREIGN PATENT DOCUMENTS

6-105571  4/1994  Japan .

*Primary Examiner*—Mark O. Budd
*Attorney, Agent, or Firm*—Frishauf, Holtz, Goodman, Langer & Chick

[57] ABSTRACT

An ultrasonic motor comprises a piezoelectric element functioning as a driving source; a rectangular-parallelepipedic elastic body coupled to the piezoelectric element and vibrated by the piezoelectric element; and a driving circuit for generating a driving signal consisting of a burst wave with an envelope having attenuation characteristics in a vibration attenuation period of the elastic body and applying the driving signal to the piezoelectric element, thereby generating an extending/contracting vibration along a longitudinal direction of the elastic body and a bending vibration propagating in the longitudinal direction of the elastic body.

27 Claims, 11 Drawing Sheets

ELLIPTIC VIBRATION
(WHEN ROTATIONAL DIRECTION
IS COUNTERCLOCKWISH)

F I G. 15

F I G. 16

ULTRASONIC MOTOR AND METHOD OF DRIVING THE SAME

BACKGROUND OF THE INVENTION

1. Field of the Invention

The present invention relates generally to an ultrasonic motor and method of driving the same for use in various types of driving apparatuses for optical devices, and more particularly to a standing wave type ultrasonic motor.

2. Description of the Related Art

Recently, ultrasonic motors have been used in the field of precision mechanical equipment and optical devices. As compared to a conventional electromagnetic motor, the ultrasonic motor has a smaller size and a higher torque. In general, there are two types of ultrasonic motors: rotary type ultrasonic motors and linear type ultrasonic motors.

Figure 10:
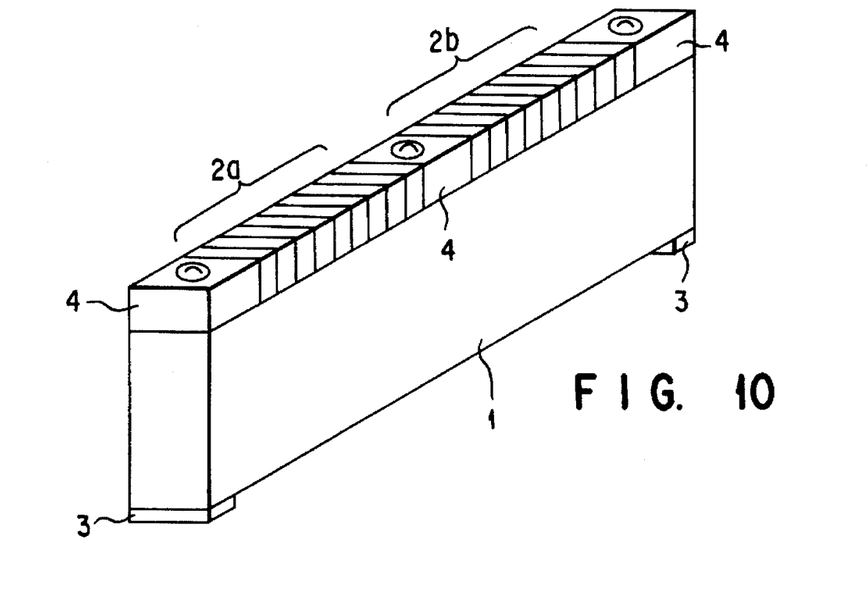
FIG. 10 is a perspective view showing the structure of an ultrasonic oscillator in a conventional ultrasonic linear motor.

FIG. 10 is a perspective view showing the structure of an ultrasonic oscillator in an ultrasonic linear motor disclosed in Jap. Pat. Appln. KOKAI Publication No. 6-105571. This ultrasonic linear motor can cause translational motion by using, as driving sources, piezoelectric elements which are electric-to-mechanic energy conversion elements. In the ultrasonic oscillator shown in FIG. 10, a pair of piezoelectric elements $2a$ and $2b$ are disposed on an upper surface of a rectangular-parallelepipedic basic elastic body 1. A pair of sliding members 3 are disposed on a lower surface of the basic elastic body 1. A holding elastic body 4 holds the piezoelectric elements $2a$ and $2b$ on the basic elastic body 1.

Figures 11, 12:
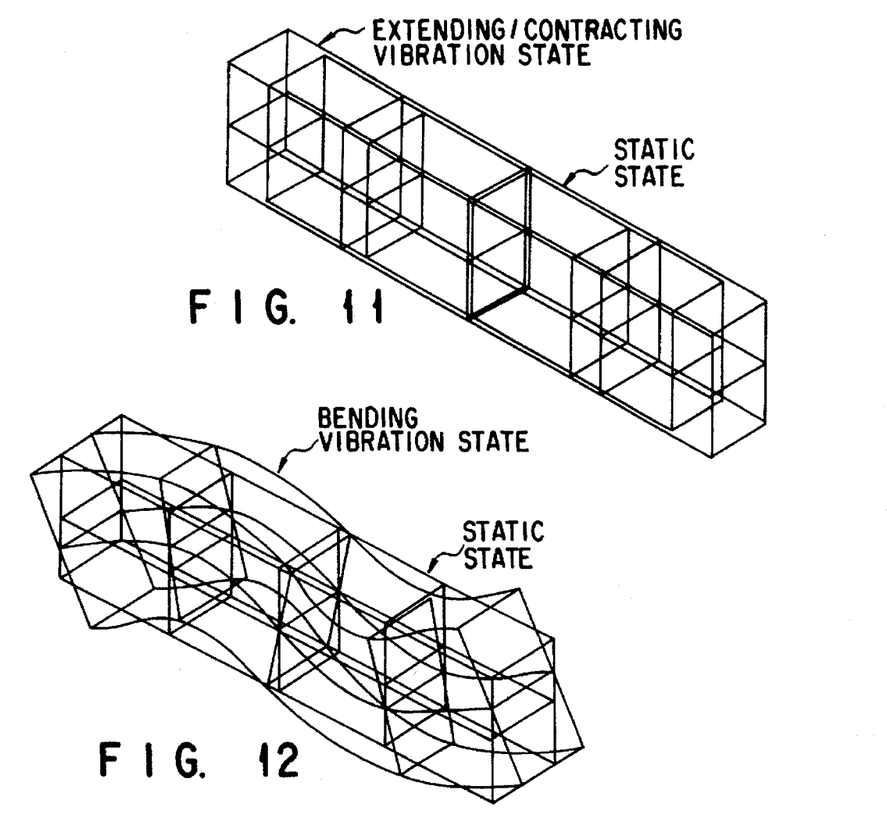
FIG. 11 schematically illustrates an extending/contracting vibration operation of the conventional ultrasonic oscillator.
FIG. 12 schematically illustrates a bending vibration operation of the conventional ultrasonic oscillator.

FIG. 11 schematically illustrates an extending/contracting vibration operation of the ultrasonic oscillator, and FIG. 12 schematically illustrates a bending vibration operation of the ultrasonic oscillator. When a sine-wave voltage is applied to the piezoelectric elements $2a$ and $2b$ in the ultrasonic oscillator, the basic elastic body 1 extends and contracts in the longitudinal direction, as shown in FIG. 11. At the same time, the basic elastic body 1 vibrates in a bending manner in accordance with transverse waves consisting of secondary standing waves propagating in the longitudinal direction, as shown in FIG. 12.

In the ultrasonic oscillator, the length and width of the basic elastic body 1 are set so that the primary resonance frequency of the extending/contracting vibration coincides with the frequency of the secondary bending vibration due to transverse waves. Thus, at the maximum bending point (the position of the loop of vibration) of the secondary standing waves, the displacement of the extending/contracting vibration and that of the bending vibration are compounded, and the material point on the basic elastic body 1 moves along an elliptic locus. Accordingly, by disposing the sliding members 3 at the maximum bending points, a driven object (not shown) to be pushed by the sliding members 3 can be translated.

Figure 13A:
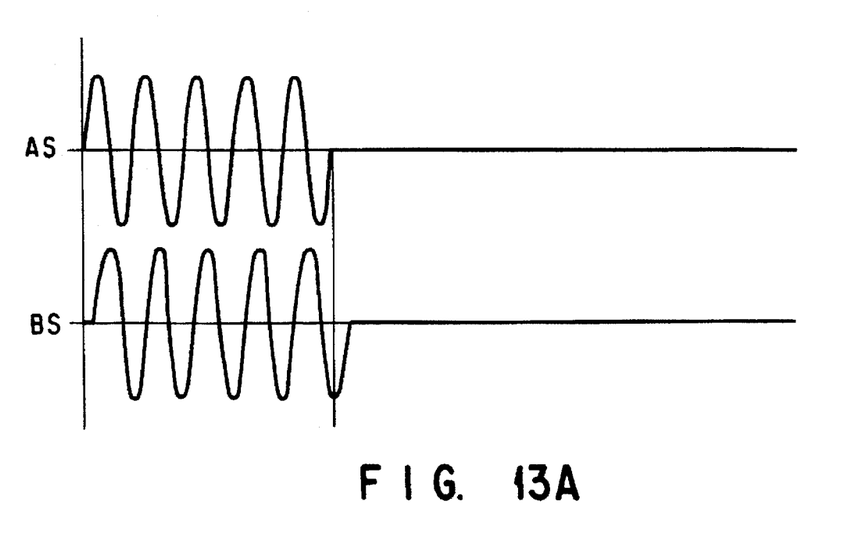
FIG. 13A shows driving signals for the conventional ultrasonic motor.
Figure 13B:
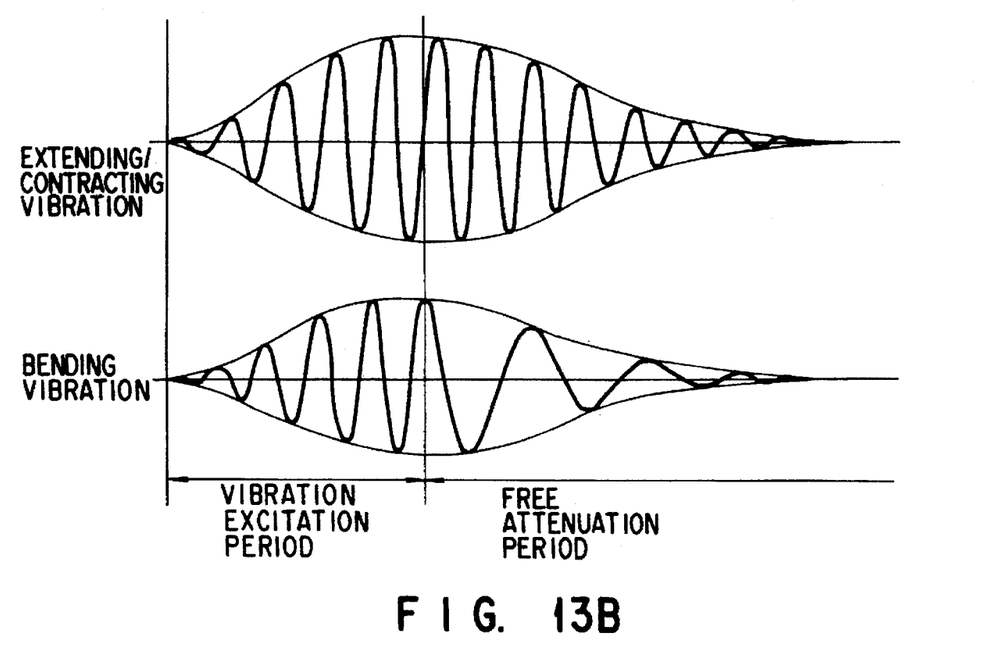
FIG. 13B shows signal waveforms of extending/contracting vibration and bending vibration of the conventional ultrasonic oscillator.

FIGS. 13A and 13B show examples of signal waveforms for describing a method of driving the ultrasonic motor. FIG. 13A shows driving signals and FIG. 13B shows signal waveforms of extending/contracting vibration and bending vibration. When the ultrasonic motor is slightly driven, driving signals AS and BS consisting of burst waves are applied to the piezoelectric elements $2a$ and $2b$. At this time, as shown in FIG. 13A, a phase difference between the driving signals AS and BS is set at $\pi/2$ or $-\pi/2$, thereby determining the direction of driving the driven object.

Figure 14:
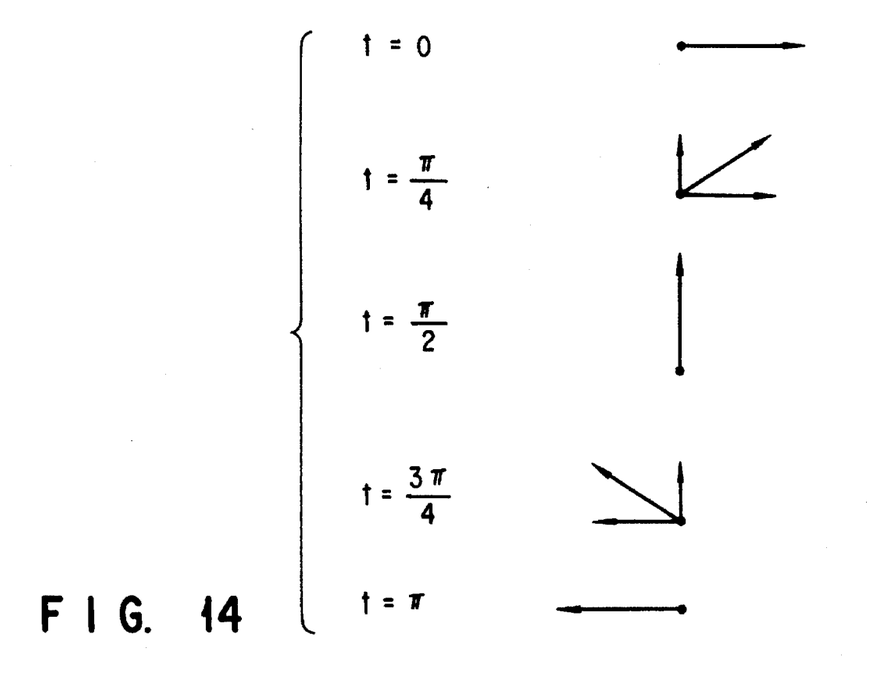
FIG. 14 illustrates the compounding of vibrational displacements due to the extending/contracting vibration and bending vibration in the conventional ultrasonic oscillator.
Figure 15:
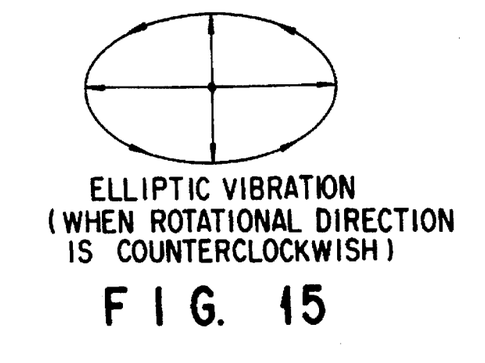
FIG. 15 shows the rotational direction of elliptic vibration of the conventional ultrasonic oscillator.

FIG. 14 illustrates the compounding of vibrational displacements due to the extending/contracting vibration and bending vibration in the ultrasonic oscillator. In FIG. 14, horizontal arrows denote displacement due to the extending/contracting vibration, and vertical arrows denote displacement due to the bending vibration. As is shown in FIG. 14, the phase of the direction of the bending vibration, as viewed in the direction of the extending/contracting vibration, generally varies from 0 to $\pi$, as seen from FIG. 14 in which shown are: (t=0, $\pi/4$, $\pi/2$, $3\pi/4$, $\pi$). In this manner, while the phase of the direction of the bending vibration, as viewed from the standpoint of the direction of the extending/contracting vibration, varies on the basis of "$\pi$", the displacement due to the extending/contracting vibration and that due to the bending vibration are compounded. Thereby, the elliptic vibration of the ultrasonic oscillator rotates in one direction, as shown in FIG. 15 (in the counterclockwise direction in FIG. 15).

However, the following problem arises when the standing wave type ultrasonic motor is slightly moved by burst wave driving signals in the manner described above.

As is shown in FIG. 13B, each of the extending/contracting vibration and the bending vibration occurs at the same and constant frequency during the application of burst wave driving signals, i.e. in the vibration excitation period. However, in a free attenuation period of vibration after the vibration excitation period, the frequency of each of the extending/contracting vibration and the bending vibration tends to vary, as shown in FIG. 13B. The frequency of each of the extending/contracting vibration and the bending vibration in the free attenuation period is not necessarily kept constant. This tendency of variation in frequency is generally conspicuous in the bending vibration. If each of the frequency of the extending/contracting vibration and the bending vibration is not constant, the driving phase varies. As a result, the amplitude of the elliptic vibration as shown in FIG. 15 varies undesirably.

Figure 16:
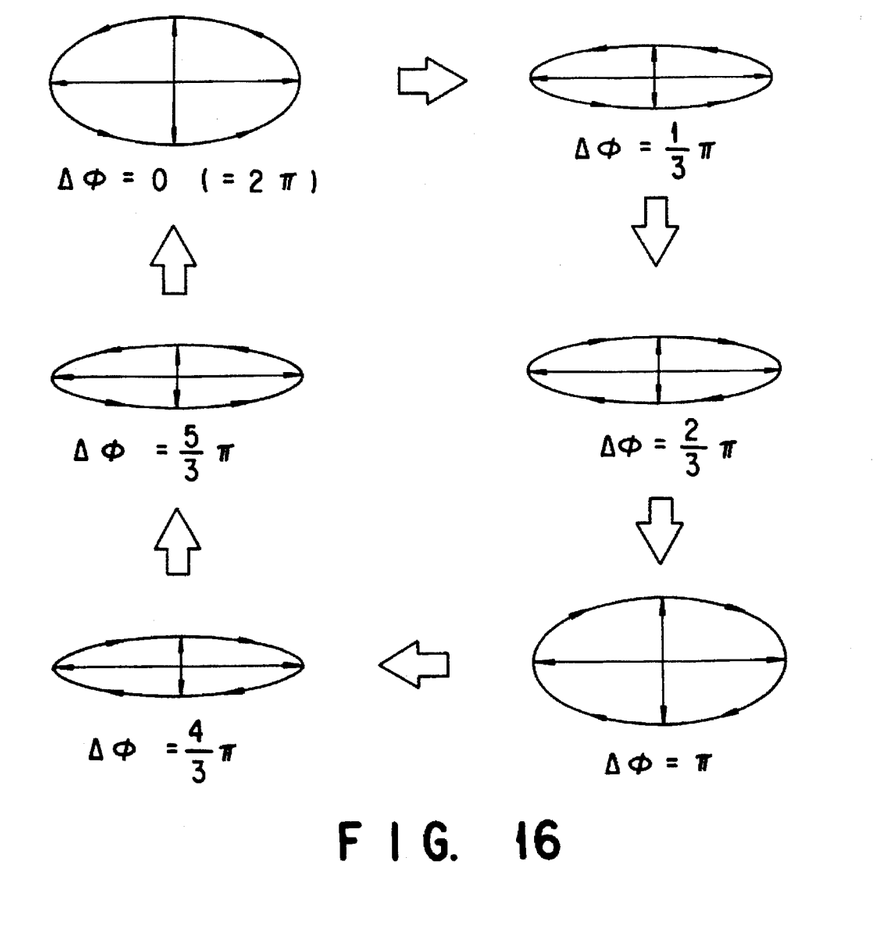
FIG. 16 shows an example of the variation in amplitude of the aforementioned elliptic vibration.

FIG. 16 shows an example of the variation in amplitude of the aforementioned elliptic vibration. In FIG. 16, the rotational direction of the elliptic vibration is reversed while the phase difference $\Delta\phi$ between the extending/contracting vibration and bending vibration varies from 0 to $\pi$. Furthermore, the rotational direction of the elliptic vibration is reversed once again while the phase difference $\Delta\phi$ between the extending/contracting vibration and bending vibration varies from $\pi$ to $2\pi$. Thus, the rotational direction of the elliptic vibration restores to that at the time the phase difference $\Delta\phi$ is 0. In this manner, in the free attenuation period of vibration, the elliptic vibration of the ultrasonic oscillator gradually attenuates while the rotational direction of phase is alternately changed.

When the rotational direction of elliptic vibration is thus changed, however, a reverse propelling force occurs when the rotational direction is reverse to the direction in which the driven object should be moved. Consequently, the driven object is moved in the reverse direction. As a result, fine positioning of the driven object becomes difficult and the precision of positioning deteriorates.

SUMMARY OF THE INVENTION

The object of the present invention is to provide an ultrasonic motor and a method of driving the same which are capable of enhancing the positioning precision of a driven object by not causing a reverse propelling force in an attenuation period of elliptic vibration.

According to the invention, there is provided an ultrasonic motor comprising:

a piezoelectric element functioning as a driving source;

a rectangular-parallelepipedic elastic body coupled to the piezoelectric element and vibrated by the piezoelectric element; and a driving circuit for generating a driving signal consisting of a burst wave with an envelope having attenuation characteristics in a vibration attenuation period of the elastic body and applying the driving signal to the piezoelectric element, thereby generating an extending/contracting vibration along a longitudinal direction of the elastic body and a bending vibration propagating in the longitudinal direction of the elastic body.

According to the invention, there is provided a method of driving an ultrasonic motor in which a piezoelectric element is driven to generate an extending/contracting vibration along a longitudinal direction of an elastic body and a bending vibration propagating in the longitudinal direction of the elastic body, wherein a driving signal consisting of a burst wave is applied to the piezoelectric element, thereby exciting and vibrating the elastic body, and a driving signal consisting of a burst wave with an envelope having attenuation characteristics is applied to the piezoelectric element in a vibration attenuation period after the elastic body is excited and vibrated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the present invention will now be described with reference to the accompanying drawings.

Figure 1:
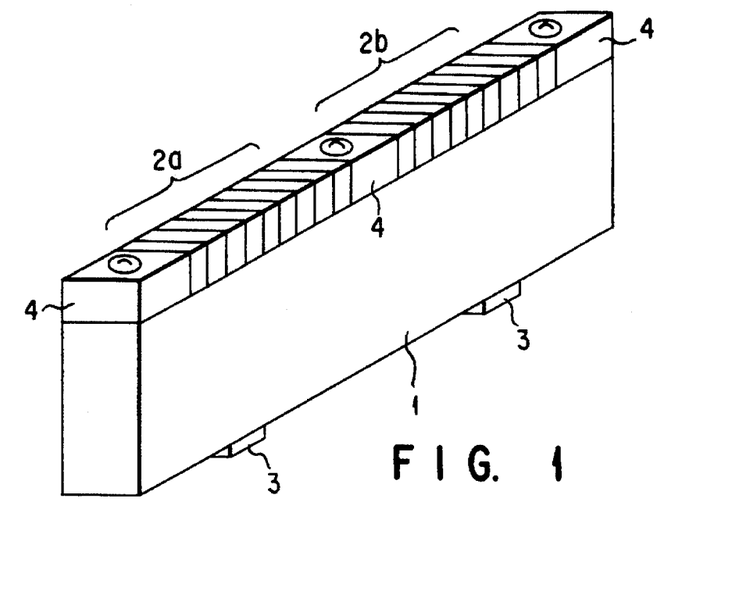
FIG. 1 is a perspective view showing the structure of an ultrasonic oscillator in an ultrasonic motor according to a first embodiment of the invention.

FIG. 1 is a perspective view showing the structure of an ultrasonic oscillator in an ultrasonic linear motor according to a first embodiment of the present invention. The ultrasonic motor of the first embodiment can cause translational motion by using, as driving sources, piezoelectric elements which are electric-to-mechanic energy conversion elements. In the ultrasonic oscillator shown in FIG. 1, a pair of piezoelectric elements 2a and 2b are disposed on an upper surface of a rectangular-parallelepipedic basic elastic body 1. Concretely, the elements 2a and 2b are coupled with the upper surface of the basic elastic body 1. A pair of sliding members 3 are disposed on a lower surface of the basic elastic body 1. A holding elastic body 4 holds the piezoelectric elements 2a and 2b on the basic elastic body 1. The sliding members 3 are situated near the maximum bending points (the positions of the loops of vibration) of secondary standing waves.

Figure 2:
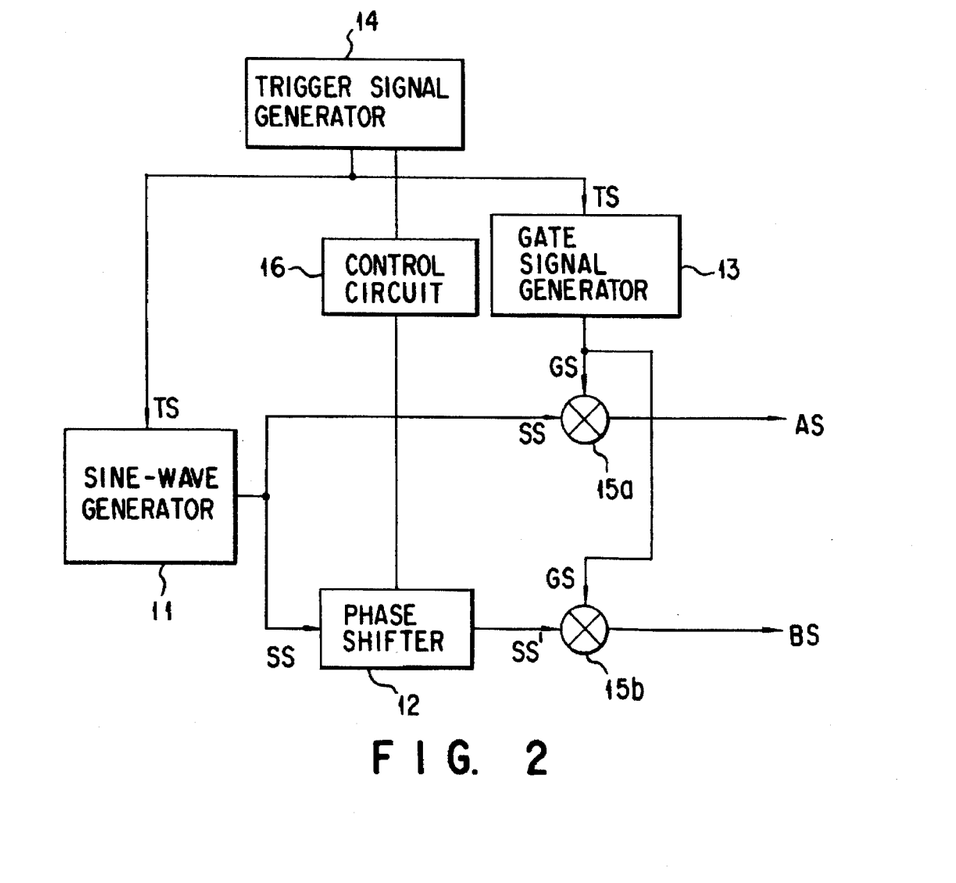
FIG. 2 is a circuit block diagram showing the structure of a drive circuit for the ultrasonic motor.

FIG. 2 is a circuit block diagram showing the structure of a drive circuit for the ultrasonic motor. The drive circuit shown in FIG. 2 comprises a sine-wave generator 11, a phase shifter 12, a gate signal generator 13, a trigger signal generator 14, multipliers 15a and 15b, and a control circuit 16.

The sine-wave generator 11 successively generates a sine wave SS of a predetermined frequency, e.g. 55.5 kHz. The sine wave SS is divided into two components, one of which is directly delivered to the multiplier 15a and the other of which is delivered to the phase shifter 12. The phase shifter 12 phase-shifts the sine wave component SS by $\pi/2$ or $-\pi/2$ in accordance with a driving direction control signal supplied from the control circuit 16. The phase-shifted sine wave SS' is fed to the multiplier 15b.

The trigger signal generator 14 generates trigger signals TS for driving the ultrasonic oscillator and supplies them to the sine-wave generator 11 and gate signal generator 13. The gate signal generator 13 is synchronized with the trigger signal TS and generates a gate signal GS for producing a burst wave.

Figure 3:
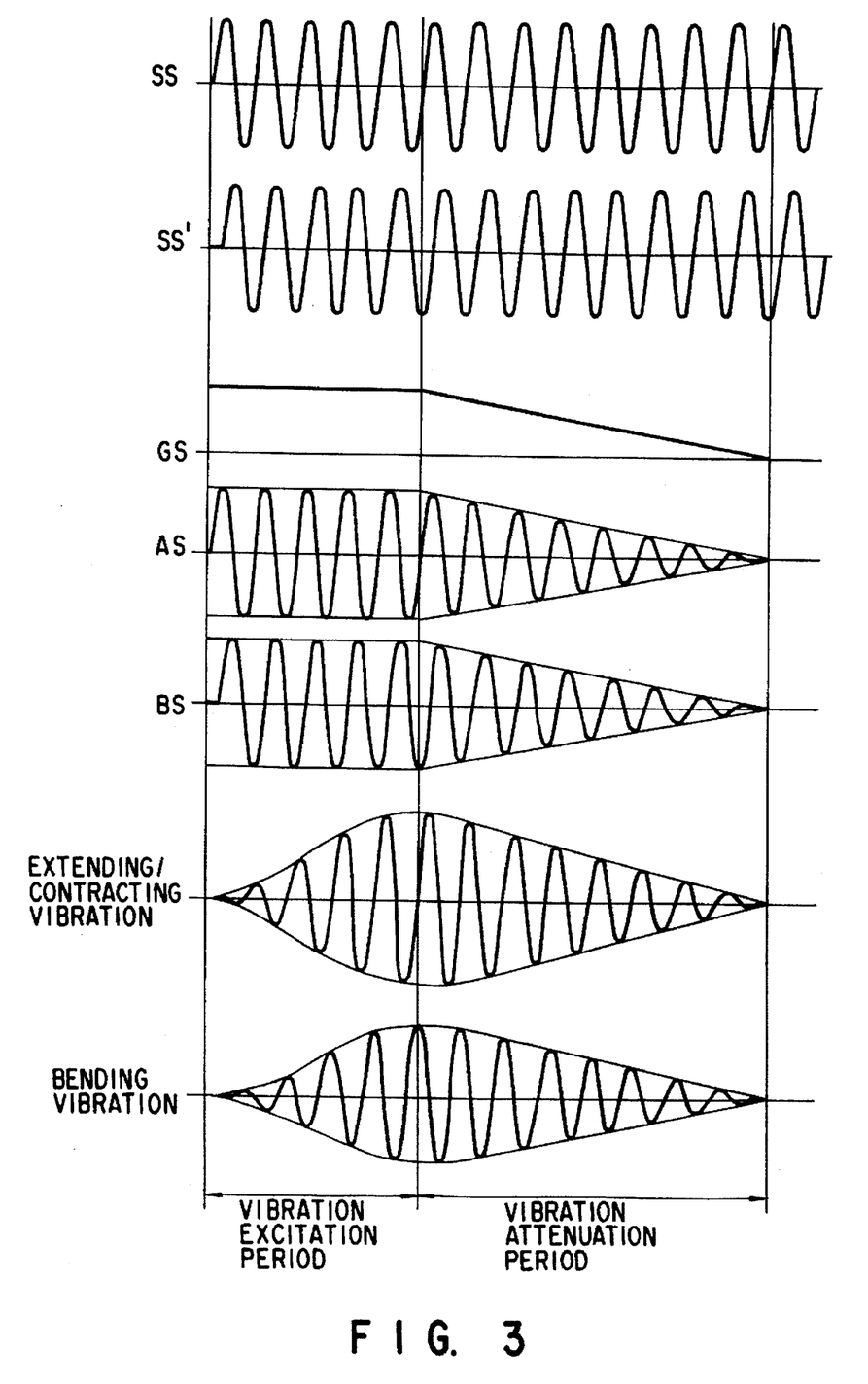
FIG. 3 shows signal waveforms for describing the operations of the ultrasonic motor drive circuit and the ultrasonic oscillator.

FIG. 3 shows signal waveforms for describing the operations of the ultrasonic motor drive circuit and the ultrasonic oscillator. The rising portion of the gate signal GS shown in FIG. 3 is steep, like a regular pulse. However, the amplitude level of the gate signal GS attenuates gradually linearly in the latter portion of the total period, which corresponds to a vibration attenuation period. The attenuation period in which the amplitude level decreases linearly is longer than the free attenuation period of the extending/contracting vibration waveform and bending vibration waveform of the basic elastic body 1. The length of the attenuation period may be set to the length of the period between the time point at which the amplitude level begins to attenuate and the time point at which the amplitude level has decreased to a predetermined value less than the amplitude necessary for driving the ultrasonic motor. The amplitude level of the gate signal GS in the vibration attenuation period is set to be equal to or greater than the corresponding amplitude in the free attenuation period of the extending/contracting vibration waveform and bending vibration waveform of the basic elastic body 1.

The gate signal GS generated by the gate signal generator 13 is delivered to each of the multipliers 15a and 15b. In the multiplier 15a, the sine wave SS is multiplied by the gate signal GS. A modulated sine wave modulated by the gate signal GS is output from the multiplier 15a. This modulated sine wave is applied to the piezoelectric element 2a as a phase-A driving signal AS. On the other hand, in the multiplier 15b, the sine wave SS' phase-shifted by the phase shifter 12 is multiplied by the gate signal GS. A phase-shifted sine wave modulated by the gate signal GS is output from the multiplier 15b. This phase-shifted sine wave is applied to the piezoelectric element 2b as a phase-B driving signal BS.

In the above structure, when the trigger signal TS is generated from the trigger signal generator 14 in response to a drive command from the control circuit 16, the sine-wave generator 11 starts to generate the sine wave SS in synchronism with the trigger signal TS. The sine wave SS is divided into two components, one of which is supplied directly to the multiplier 15a and the other of which is phase-shifted by the phase shifter 12 by π/2 (or −π/2) and then supplied to the multiplier 15b.

On the other hand, the gate signal generator 13 generates the gate signal GS in synchronism with the trigger signal TS and delivers it to each of the multipliers 15a and 15b. As is shown in FIG. 3, the rising portion of the waveform of the gate signal GS is steep, like a regular pulse. However, the amplitude level of the gate signal GS attenuates gradually linearly after the end of the vibration excitation period. Accordingly, in the multipliers 15a and 15b, the sine wave SS and phase-shifted sine wave SS' are gate-controlled in accordance with the waveform of the gate signal GS. Thereby, the multipliers 15a and 15b output driving signals AS and BS consisting of burst waves, the amplitudes of which attenuate linearly in the vibration attenuation period following the vibration excitation period, that is, the envelopes of which attenuate linearly, as shown in FIG. 3. The driving signals AS and BS are applied to the piezoelectric elements 2a and 2b of the ultrasonic oscillator.

In the vibration excitation period, the ultrasonic oscillator begins at first to vibrate due to the driving signals AS and BS and reaches a normal state, for example, in about 20 cycles of the driving signals AS and BS. In the vibration attenuation period following the vibration excitation period, the vibration of the oscillator gradually attenuates, with the same frequency as that in the normal state maintained, in accordance with the linear attenuation characteristics of the driving signals AS and BS, as shown in FIG. 3.

As has been described above, in the driving circuit for the ultrasonic motor according to the first embodiment, the gate signal generator 13 generates the gate signal GS which is controlled so as to gradually attenuate the amplitude level linearly in the time period corresponding to the vibration attenuation period following the vibration excitation period of the ultrasonic oscillator. On the basis of the gate signal GS, the multipliers 15a and 15b gate-control the sine wave SS and phase-shifted sine wave SS' and produce the driving signals AS and BS. The ultrasonic oscillator is driven by applying the driving signals AS and BS to the piezoelectric elements 2a and 2b.

According to the first embodiment, therefore, even after the vibration excitation period, the driving signals AS and BS, the amplitudes of which attenuate linearly, that is, the envelopes of which attenuate linearly, continue to be applied to the piezoelectric elements 2a and 2b of the ultrasonic oscillator. Thus, each of the extending/contracting vibration waveform and bending vibration waveform of the basic elastic body 1 of the ultrasonic oscillator does not freely attenuate and attenuates with the same frequency maintained until the amplitude becomes zero. Thereby, the phase difference between the extending/contracting vibration waveform and bending vibration waveform does not vary and is kept constant until their amplitudes become zero. As a result, the rotational direction of elliptic vibration, which is a compound of the extending/contracting vibration waveform and bending vibration waveform, is constant at all times. Therefore, the occurrence of reverse propelling force in the vibration attenuation period can be prevented, and the object to be driven can be positioned with high precision.

In the first embodiment, the ultrasonic oscillator is driven by the driving signals AS and BS produced and controlled so as to have their amplitudes attenuated gradually linearly in the period corresponding to the vibration attenuation period of the ultrasonic oscillator. In a second embodiment of the invention, driving signals AS' and BS' are produced, which are controlled so as to have their amplitudes attenuated gradually linearly in the vibration attenuation period and have their amplitudes increased gradually linearly in the beginning portion of the vibration excitation period. Specifically, the driving signals AS' and BS' consist of burst waves having such characteristics that their envelopes begin to rise linearly in the beginning portion of the vibration excitation period and attenuate linearly in the vibration attenuation period. The ultrasonic oscillator is driven by these driving signals AS' and BS'. The ultrasonic motor drive circuit and ultrasonic oscillator of the second embodiment have the same structures as those of the first embodiment.

Figure 4:
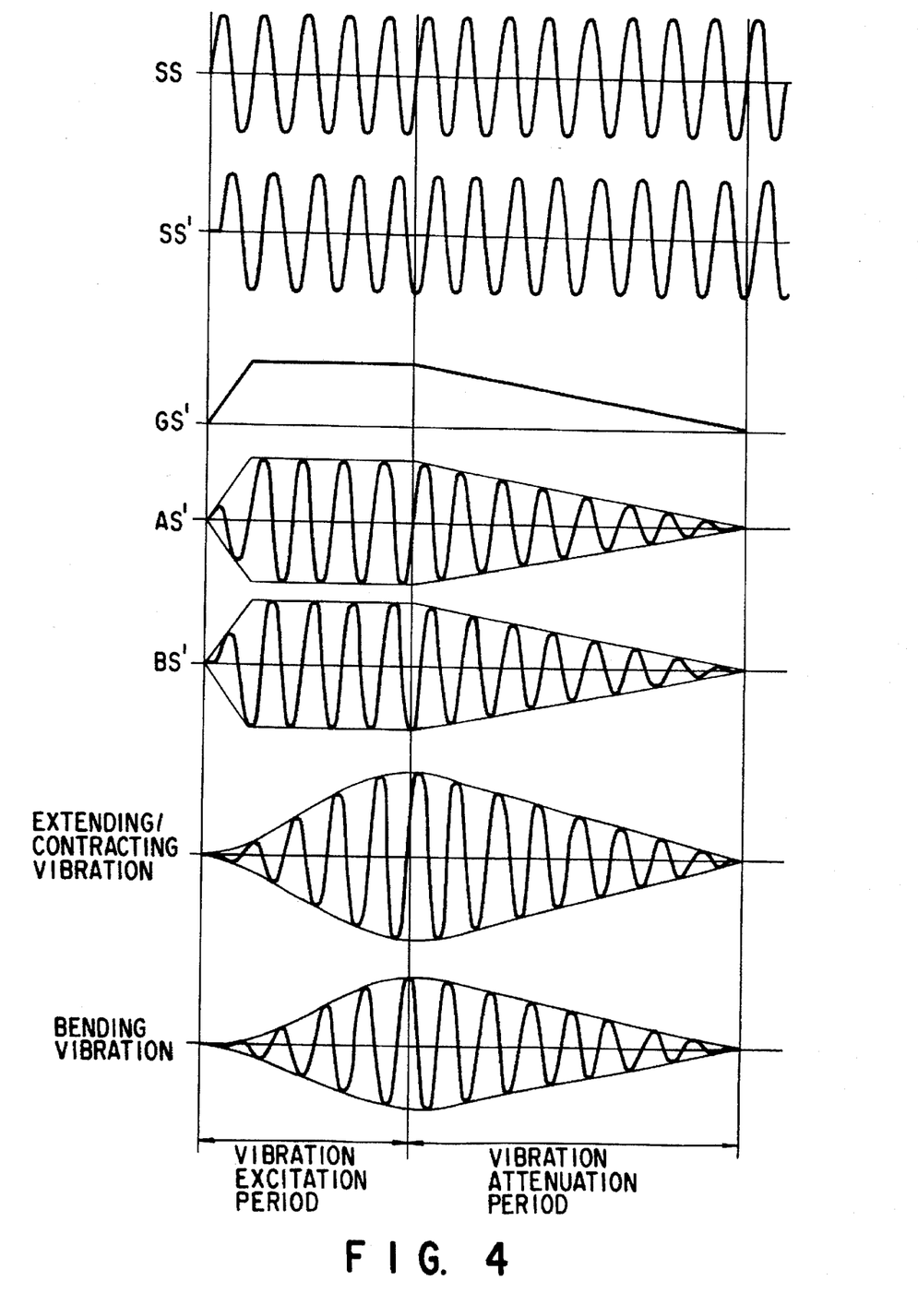
FIG. 4 shows signal waveforms for describing the operations of the ultrasonic motor drive circuit and the ultrasonic oscillator according to a second embodiment of the invention.

FIG. 4 shows signal waveforms for describing the operations of the ultrasonic motor drive circuit and the ultrasonic oscillator according to the second embodiment of the invention. The gate signal generator 13 generates a gate signal GS' with amplitude characteristics which increase linearly in the time period corresponding to the beginning portion of the vibration excitation period and decrease linearly in the time period corresponding to the vibration attenuation period. In accordance with the gate signal GS', the sine wave SS and phase-shifted sine wave SS' thereof are gate-controlled in the multipliers 15a and 15b, respectively. The gate-controlled sine waves are applied to the piezoelectric elements of the ultrasonic oscillator as driving signals AS' and BS'.

By thus driving the ultrasonic oscillator, the vibration amplitude can be attenuated in the vibration attenuation period with the vibration frequency being kept constant and can be gradually increased in the beginning portion of the vibration excitation period. Accordingly, even when driving signals with great amplitudes are applied to the ultrasonic oscillator, vibration can be caused exactly in accordance with amplitude variations in the driving signals. Therefore, the vibration frequency can be kept constant from the beginning of vibration excitation to the end of vibration attenuation, the rotational direction of the aforementioned elliptic vibration can be kept constant at all times, and the positioning precision of the driven object can be further enhanced.

Figure 5A:
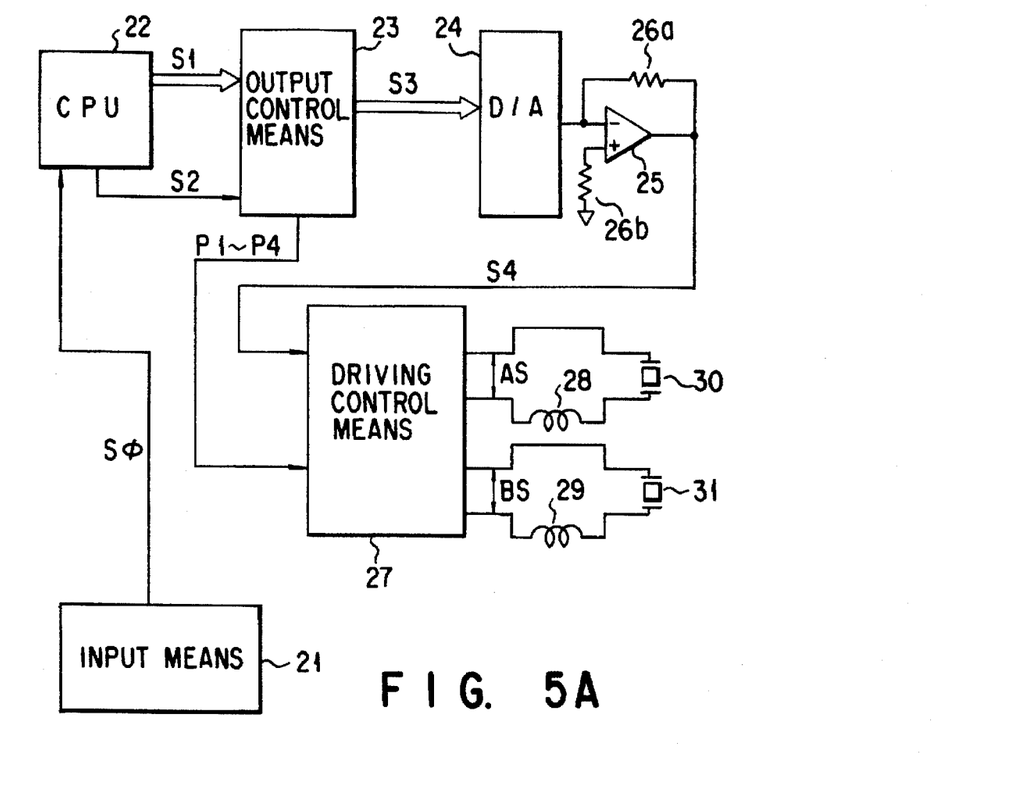
FIG. 5A is a circuit block diagram showing the structure of a drive circuit for a ultrasonic motor according to a third embodiment of the invention.

FIG. 5A is a circuit block diagram showing the structure of a drive circuit for a ultrasonic motor according to a third embodiment of the invention. The ultrasonic oscillator in the third embodiment has the same structure as that of the first embodiment. The drive circuit shown in FIG. 5A comprises input means 21, a CPU 22, output control means 23, a D/A converter 24, an operational amplifier 25, resistors 26a and 26b, driving control means 27, an inductors 28 and 29, and piezoelectric elements 30 and 31 (corresponding 2a and 2b).

The input means 21 delivers to the CPU 22 data on the shapes of envelopes of driving signals corresponding to the beginning portion of the vibration excitation period and vibration attenuation period of the ultrasonic oscillator, which shapes are determined by the operator. In addition, the input means 21 sends to the CPU 22 instructions relating to the amount of operation and direction of motion of the ultrasonic motor (not shown) including the piezoelectric elements 30 and 31. The CPU 22 transfers to the output control means 23 a burst pulse number S1 calculated on the basis of the amount of operation instructed from the input means 21 and representing the number of burst pulses applied to the piezoelectric elements 30 and 31, as well as application voltage data for each burst pulse, and a trigger signal S2 relating to the start of generation of burst basic pulses (described later).

The output control means 23 controls the shapes of the envelopes and the burst basic pulses and stores in an internal register the burst pulse number S1 and application voltage data for each pulse, which are transferred from the CPU 22. Upon receiving the trigger signal S2 relating to the start of generation of the burst basic pulses from the CPU 22, the output control means 23 generates four-phase burst basic pulses P1 to P4. Each time the burst basic pulse, P1 to P4, is output, associated application voltage data S3 is output to the D/A converter 24. If the application voltage data S3 has 12 bits, adequately precise control can be effected. The D/A converter 24 D/A-converts the input 12-bit application voltage data S3.

The output control means 23 comprises various logic elements and memories, and is constructed as one chip by, e.g. FPGA. The D/A converter 24 D/A-converts the application voltage data (12-bit data) S3 input from the output control means 23, and outputs a corresponding electric current. The current is I-V converted by the operational amplifier 25 and applied to the driving control means 27 as voltage.

The driving control means 27 comprises transistors, a transformer, etc. (not shown). On the basis of the burst basic pulses P1 to P4 input from the output control means 23 and the voltage applied from the operational amplifier 25, the driving control means 27 generates driving signals consisting of burst pulses to be applied to the piezoelectric elements 30 and 31. The inductors 28 and 29 are provided in order to constitute low-pass filters. The inductors 28 and 29 prevent such a situation from arising, that a harmonic component of switched voltage is applied to the piezoelectric elements 30 and 31 or electrical capacitive loads and thus an eddy current occurs.

The operation of the ultrasonic motor driving circuit having the above structure will now be described. At first, the operator inputs, through the input means 21, the burst pulse number for driving the ultrasonic motor (not shown) comprising piezoelectric elements 30 and 31. In addition, the operator inputs, through the input means 21, the data on the direction of extending/contracting vibration of the ultrasonic motor and the shape of the envelope of the driving signal corresponding to the beginning portion of the vibration excitation period and the vibration attenuation period. The data input from through the input means 21 is sent to the CPU 22.

The number of driving pulses in the beginning portion of the vibration excitation period and vibration attenuation period is preset. The shapes of envelopes in these periods can be determined such that the operator selects several shapes preprogrammed in the CPU 22 by means of the input means 21. The shapes of the envelopes can also be determined such that the operator prepares voltage data for each pulse by means of the input means 21.

Figure 6:
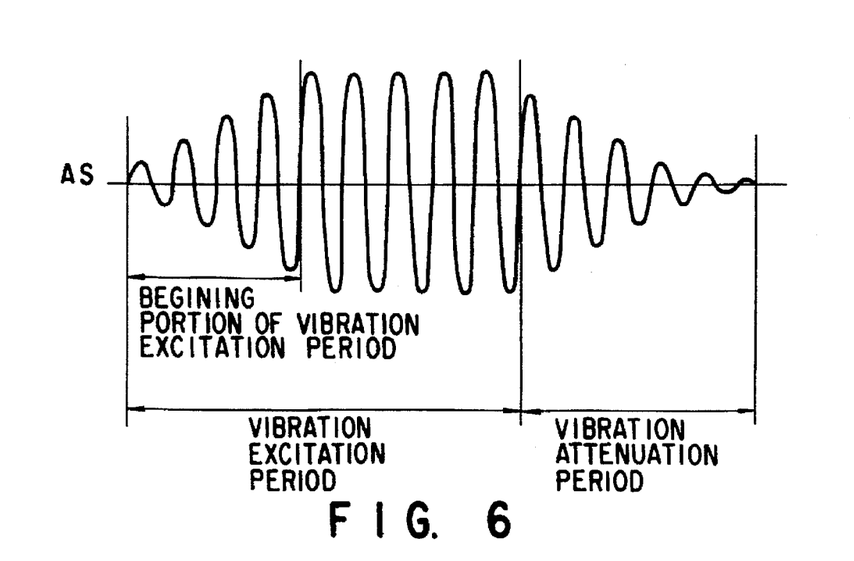
FIG. 6 shows a vibration excitation period and a vibration attenuation period of a driving signal.

FIG. 6 shows the vibration excitation period and vibration attenuation period of the aforementioned driving signal. In an example of a method of preparing the aforementioned voltage data, the operator assigns addresses to the pulses in the beginning portion of the vibration excitation period and vibration attenuation period shown in FIG. 6 and inputs through the input means 21 voltage values of applied voltages associated with the addresses, respectively. Thereby, a desired shape of the envelope can be determined. Thus, for example, an envelope varying in a stepwise manner can be set.

Based on the instruction from the input means 21, the CPU 22 calculates the number of burst pulses corresponding to the amount of operation, S$\phi$, of the ultrasonic motor and sends the signal S1 representing the number of burst pulses to the output control means 23. Subsequently, based on the shape of the envelope of the driving signal corresponding to the instruction from the input means 21, the CPU 22 transfers to the output control means 23 the application voltage data associated with the burst pulses represented by the signal S1.

If the burst pulse number represented by the signal S1 is 100, 100 application voltage data units are sent to the output control means 23. Since the D/A converter 24 processes 12-bit data, as mentioned above, the application voltage data sent from the output control means 23 has a 12-bit structure. The burst pulse number S1 and application voltage data sent from the CPU 22 are stored in the output control means 23. If all application voltage data has been transferred from the CPU 22, the trigger signal S2 relating to the start of burst basic pulse generation is output to the output control means 23. Upon receiving the trigger signal S2, the output control means 23 outputs the four-phase burst basic pulses P1 to P4 to the driving control means 27.

Figure 7A:
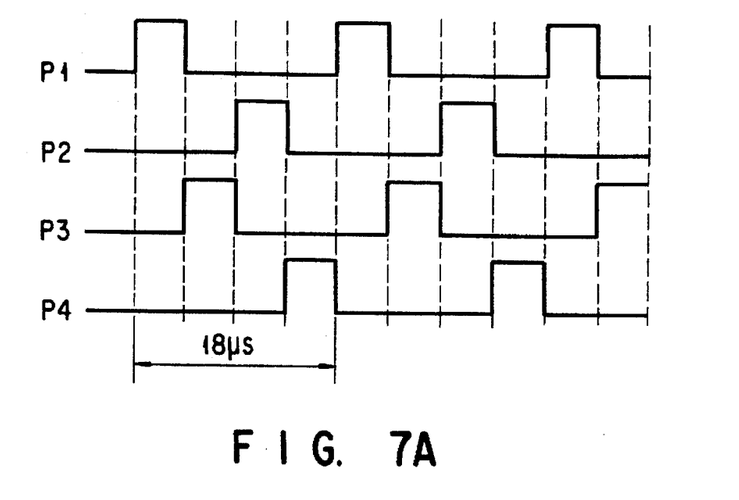
FIG. 7A shows waveforms of four-phase burst basic pulses and a driving signal.

FIG. 7A shows waveforms of the four-phase burst basic pulses P1 to P4. The frequency of each of the burst basic pulses P1 to P4 is preset at, e.g. 55.5 KHz. In this case, one cycle of each phase is about 18 μsec. This cycle is the cycle of one burst pulse.

Each time the output control means 23 outputs the burst basic pulse, P1 to P4, the output control means 23 outputs the associated application voltage data S3 to the D/A converter 24. The D/A converter 24 D/A-converts the input application voltage data S3 and the operational amplifier 25 I-V converts the resultant data. The operational amplifier 25 applies the application voltage S4 corresponding to the application voltage data S3 to the driving control means 27.

On the basis of the burst basic pulses P1 to P4 input from the output control means 23 and the voltage S4 applied from the operational amplifier 24, the driving control means 27 generates driving signals AS and BS consisting of burst waves with envelopes determined by the CPU 22. The driving signals AS and BS are applied to the piezoelectric elements 30 and 31 via the inductors 28 and 29.

Figure 7B:
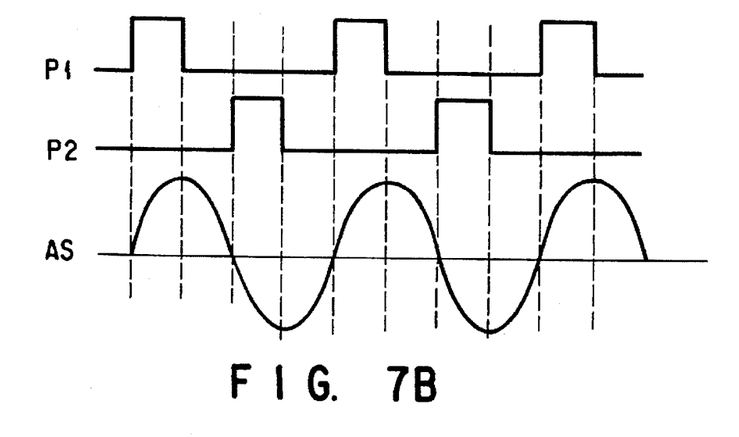
FIG. 7B relates to the driving signal produced by driving control means.
Figure 7C:
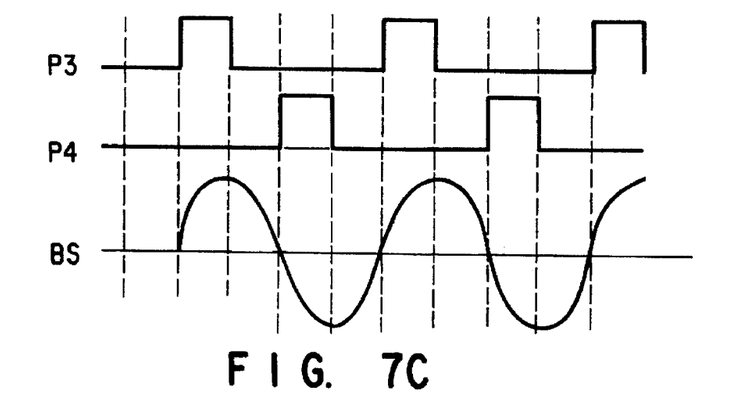
FIG. 7C relates to the driving signal produced by the driving control means.

FIGS. 7B and 7C relate to the driving signals produced by the driving control means 27. In the driving control means 27, the burst basic pulses P1 and P2 input from the output control means 23 are paired and the burst basic pulses P3 and P4 are also paired. Using the transistors and transformer (not shown), the driving signals AS and BS are generated. As is shown in FIG. 7B, the driving signal AS is produced from the burst basic pulses P1 and P2, and, as shown in FIG. 7C, the driving signal BS is produced from the burst basic pulses P3 and P4.

Figures 8A, 8B:
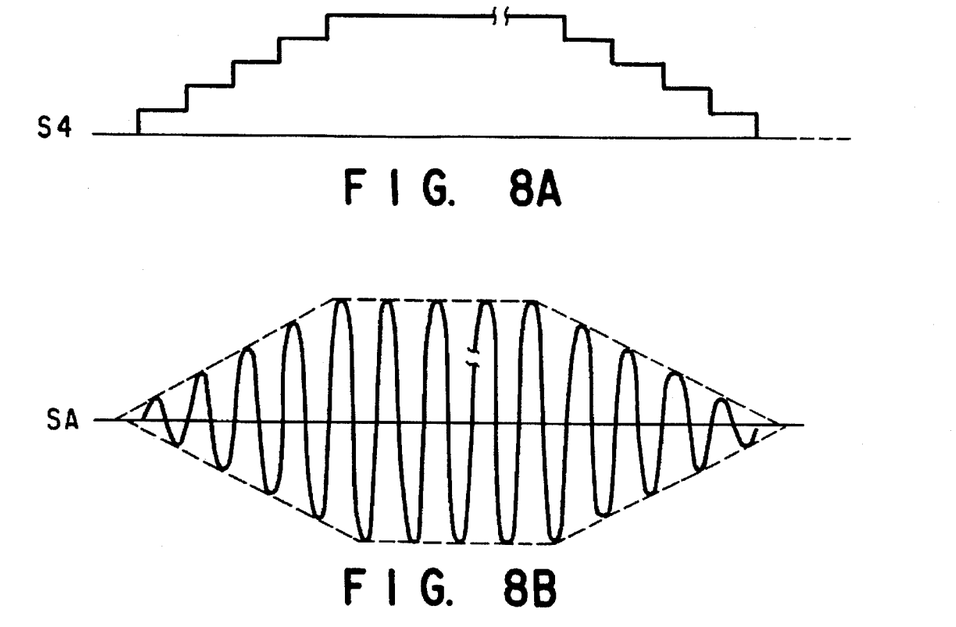
FIG. 8A shows an application voltage.
FIG. 8B shows a driving signal.
Figure 8C:
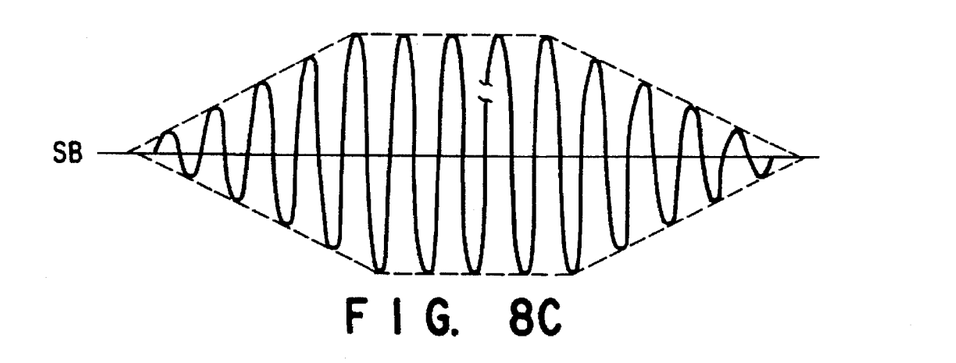
FIG. 8C shows a driving signal.
Figure 9A:
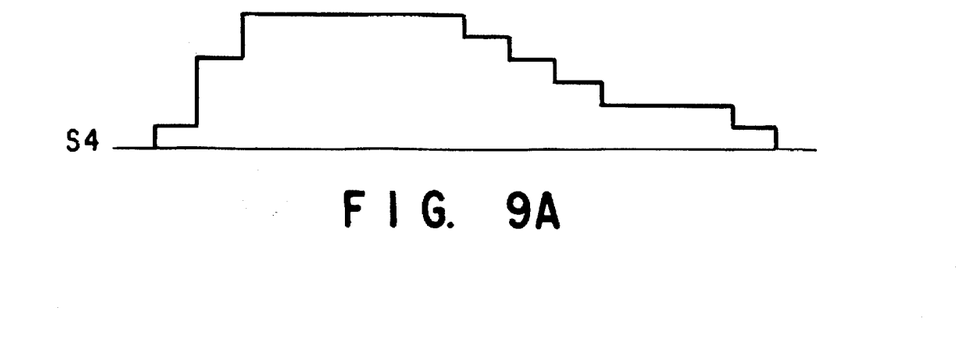
FIG. 9A shows an application voltage.
Figure 9B:
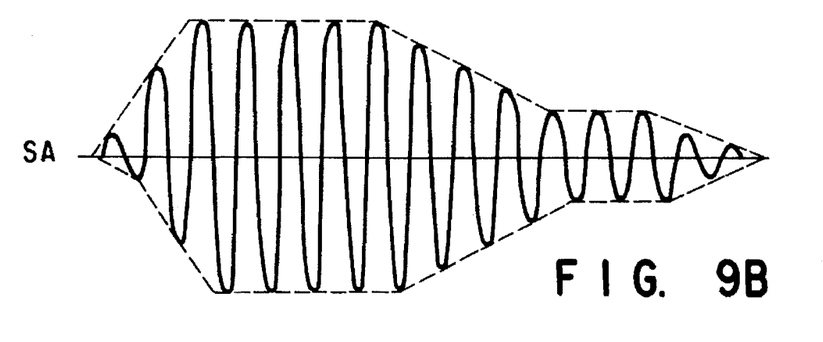
FIG. 9B shows a driving signal.
Figure 9C:
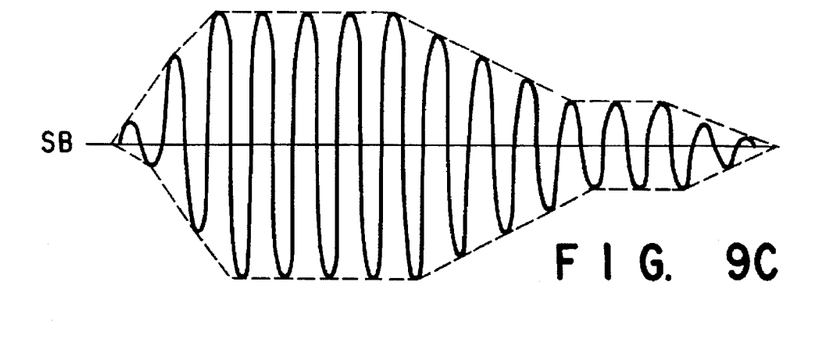
FIG. 9C shows a driving signal.

When the application voltage S4, for example, as shown in FIG. 8A, is applied to the driving control means 27 from the operational amplifier 25 through the above operational procedure, driving signals SA and SB consisting of burst waves, as shown in FIGS. 8B and 8C, are output to the piezoelectric elements 30 and 31, respectively. In addition, when the application voltage S4, for example, as shown in FIG. 9A, is applied on the basis of the parameter of the application voltage transferred from the CPU 22, driving signals SA and SB consisting of burst waves, as shown in FIGS. 9B and 9C, are output to the piezoelectric elements 30 and 31, respectively.

The use of the aforementioned parameter of the application voltage is effective, for example, in an ultrasonic motor wherein even if the application voltage is increased relatively quickly, there is no problem in the vibration excitation period of the driving signal, but it is necessary in the vibration attenuation period to slowly attenuate the application voltage to the piezoelectric elements with much time and to maintain the relationship in phase between the extending/contracting vibration and bending vibration of the elastic body.

Suppose that the ultrasonic motor and driving circuit according to the third embodiment are applied to a manipulator for manipulating cells with a microscope. In this case, the operator, while viewing a probe of the manipulator, can determine the shape of an optimal envelope by means of the input means 21 and can move the probe. Thus, smooth operation of the manipulator can be achieved.

By thus driving the ultrasonic motor, like the first and second embodiments, the vibration frequency can be kept constant from the start of vibration excitation of the driving signal to the end of vibration attenuation. Thereby, the rotational direction of the elliptic vibration of the piezoelectric element can be kept constant at all times, and the positioning precision of the driven object can be further enhanced. Furthermore, since the shape of the envelope of the driving signal can be freely varied, the optical driving signal matching with the inherent characteristics of the ultrasonic motor can be produced. For example, a driving signal consisting of a burst wave with such attenuation characteristics that the envelope varies in a stepwise manner in the vibration attenuation period of the elastic body can be produced and generated.

(Modifications)

Figure 5B:
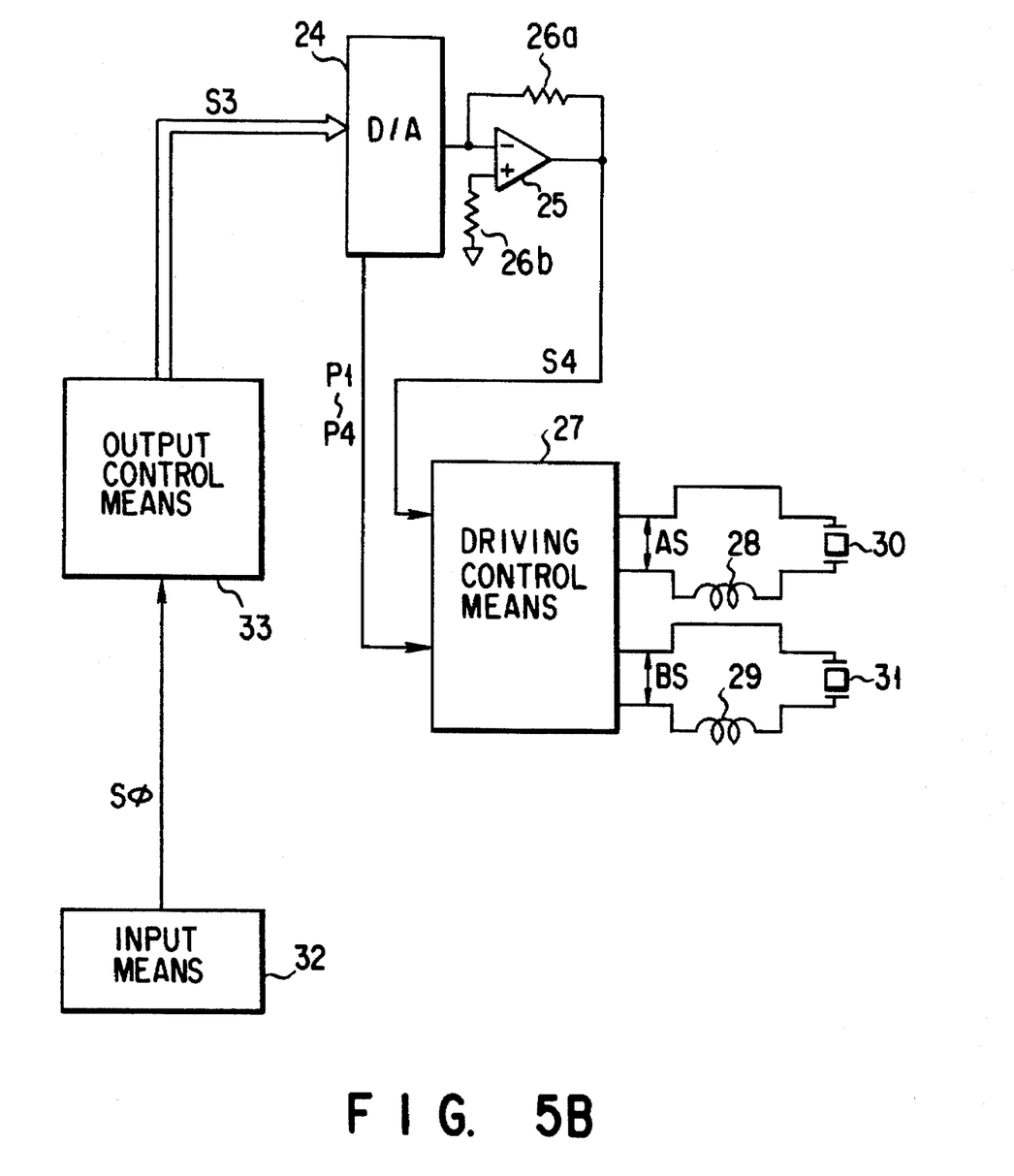
FIG. 5B is a circuit block diagram showing the structure of a drive circuit for a ultrasonic motor according to a modification of the third embodiment.

(1) FIG. 5B shows a driving circuit according to a modification of the third embodiment. A description of the structural elements common to those in the third embodiment is omitted. When the burst pulse number and data on the direction movement, which are necessary for driving the ultrasonic motor, are input through the input means 32, the burst pulse number and data are transmitted to the output control means 33. The output control means 33 stores data relating to the shape of the envelope of one kind of driving signal. In response to a command from the input means 32, the output control means 33 drives the ultrasonic motor. The driving circuit shown in FIG. 5B is suitable for the case where shapes of a plurality of envelopes are not needed. Compared to the driving circuit shown in FIG. 5A, there is no need to use a CPU and it is possible to constitute the driving circuit at lower cost.

(2) In each embodiment, the amplitude of the driving signal in the vibration attenuation period or the beginning of the vibration excitation period is linearly varied. However, the amplitude may be varied non-linearly, for example, in a cosine shape or in a two-dimensional curved shape. Thereby, for example, one-time differentiation or two-time differentiation of the envelope shape of vibration may be made continuous. Thus, the operation at the time of vibration attenuation or start of vibration can be further smoothed, and the positioning precision of the driven object can be further enhanced.

(3) If the driving signal consisting of a burst wave is provided with an envelope having a gentle inclination in the vibration excitation period and vibration attenuation period, the variation in voltage applied to the piezoelectric elements can be made gentle. Thereby, impulse-like vibration of the elastic body due to sudden change in shape of the piezoelectric elements can be curbed. As a result, the high frequency component of the operation noise can be reduced, and an unpleasant sensation to the operator can be prevented.

(4) In addition, the structure of the ultrasonic motor, the structure of the driving signal generator, the waveform of the driving signal, etc. can be modified without departing from the spirit of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An ultrasonic motor comprising:
    a piezoelectric element functioning as a driving source;
    a rectangular-parallelepipedic elastic body coupled to said piezoelectric element and vibrated by said piezoelectric element; and
    a driving circuit for generating a driving signal consisting of a burst wave with an envelope having attenuation characteristics in a vibration attenuation period of said elastic body and applying the driving signal to said piezoelectric element, thereby generating an extending/contracting vibration along a longitudinal direction of said elastic body and a bending vibration propagating in the longitudinal direction of the elastic body.

2. The ultrasonic motor according to claim 1, further comprising input means for setting a shape of the envelope of the burst wave, wherein said driving circuit generates the driving signal consisting of the burst wave having the envelope set by said input means.

3. The ultrasonic motor according to claim 1, wherein said driving circuit generates a driving signal consisting of a burst wave with such characteristics that an envelope of the burst wave linearly increases in a beginning portion of a vibration excitation period of the elastic body and linearly attenuates in the vibration attenuation period of said elastic body.

4. The ultrasonic motor according to claim 3, further comprising input means for setting a shape of the envelope of the burst wave, wherein said driving circuit generates the driving signal consisting of the burst wave having the envelope set by said input means.

5. The ultrasonic motor according to claim 3, wherein said driving circuit applies to the piezoelectric element the driving signal such that the period during which the envelope exhibits the attenuation characteristics is longer than a free attenuation period of an extending/contracting vibration and a bending vibration of the elastic body, and that the amplitude which the burst wave has while the envelope is exhibiting the attenuation characteristics is equal to or greater than the amplitude which the vibration of the elastic body assumes during the free attenuation period.

6. The ultrasonic motor according to claim 5, further comprising input means for setting a shape of the envelope of the burst wave, wherein said driving circuit generates the driving signal consisting of the burst wave having the envelope set by said input means.

7. The ultrasonic motor according to claim 1, wherein said driving circuit applies to the piezoelectric element the driving signal such that the period during which the envelope exhibits the attenuation characteristics is longer than a free attenuation period of an extending/contracting vibration and a bending vibration of the elastic body, and that the amplitude which the burst wave has while the envelope is exhibiting the attenuation characteristics is equal to or greater than the amplitude which the vibration of the elastic body assumes during the free attenuation period.

8. The ultrasonic motor according to claim 7, further comprising input means for setting a shape of the envelope of the burst wave, wherein said driving circuit generates the driving signal consisting of the burst wave having the envelope set by said input means.

9. The ultrasonic motor according to claim 1, wherein said driving circuit applies the driving signal to the piezoelectric element until the amplitude of the burst wave decreases to a predetermined level.

10. The ultrasonic motor according to claim 9, further comprising input means for setting a shape of the envelope of the burst wave, wherein said driving circuit generates the driving signal consisting of the burst wave having the envelope set by said input means.

11. An ultrasonic motor comprising:

a piezoelectric element functioning as a driving source;

a rectangular-parallelepipedic elastic body coupled to said piezoelectric element and vibrated by said piezoelectric element; and a driving circuit for generating a driving signal consisting of a burst wave with such attenuation characteristics that an envelope of the burst wave varies linearly in a vibration attenuation period of said elastic body and applying the driving signal to said piezoelectric element, thereby generating an extending/contracting vibration along a longitudinal direction of said elastic body and a bending vibration propagating in the longitudinal direction of the elastic body.

12. The ultrasonic motor according to claim 11, further comprising input means for setting a shape of the envelope of the burst wave, wherein said driving circuit generates the driving signal consisting of the burst wave having the envelope set by said input means.

13. The ultrasonic motor according to claim 11, wherein said driving circuit applies to the piezoelectric element the driving signal such that the period during which the envelope exhibits the attenuation characteristics is longer than a free attenuation period of an extending/contracting vibration and a bending vibration of the elastic body, and that the amplitude which the burst wave has while the envelope is exhibiting the attenuation characteristics is equal to or greater than the amplitude which the vibration of the elastic body assumes during the free attenuation period.

14. The ultrasonic motor according to claim 13, further comprising input means for setting a shape of the envelope of the burst wave, wherein said driving circuit generates the driving signal consisting of the burst wave having the envelope set by said input means.

15. The ultrasonic motor according to claim 11, wherein said driving circuit applies the driving signal to the piezoelectric element until the amplitude of the burst wave decreases to a predetermined level.

16. The ultrasonic motor according to claim 15, further comprising input means for setting a shape of the envelope of the burst wave, wherein said driving circuit generates the driving signal consisting of the burst wave having the envelope set by said input means.

17. An ultrasonic motor comprising:

a piezoelectric element functioning as a driving source;

a rectangular-parallelepipedic elastic body coupled to said piezoelectric element and vibrated by said piezoelectric element; and a driving circuit for generating a driving signal consisting of a burst wave with such attenuation characteristics that an envelope of the burst wave varies in a stepwise manner in a vibration attenuation period of said elastic body and applying the driving signal to said piezoelectric element, thereby generating an extending/contracting vibration along a longitudinal direction of said elastic body and a bending vibration propagating in the longitudinal direction of the elastic body.

18. The ultrasonic motor according to claim 17, further comprising input means for setting a shape of the envelope of the burst wave, wherein said driving circuit generates the driving signal consisting of the burst wave having the envelope set by said input means.

19. The ultrasonic motor according to claim 17, wherein said driving circuit applies to the piezoelectric element the driving signal such that the period during which the envelope exhibits the attenuation characteristics is longer than a free attenuation period of an extending/contracting vibration and a bending vibration of the elastic body, and that the amplitude which the burst wave has while the envelope is exhibiting the attenuation characteristics is equal to or greater than the amplitude which the vibration of the elastic body assumes during the free attenuation period.

20. The ultrasonic motor according to claim 19, further comprising input means for setting a shape of the envelope of the burst wave, wherein said driving circuit generates the driving signal consisting of the burst wave having the envelope set by said input means.

21. The ultrasonic motor according to claim 17, wherein said driving circuit applies the driving signal to the piezoelectric element until the amplitude of the burst wave decreases to a predetermined level.

22. The ultrasonic motor according to claim 21, further comprising input means for setting a shape of the envelope of the burst wave, wherein said driving circuit generates the driving signal consisting of the burst wave having the envelope set by said input means.

23. An ultrasonic motor comprising:

a piezoelectric element functioning as a driving source;

a rectangular-parallelepipedic elastic body coupled to said piezoelectric element and vibrated by said piezoelectric element; and a driving circuit for generating a driving signal consisting of a burst wave with such attenuation characteristics that an envelope of the burst wave attenuates by a predetermined amount only once in a predetermined portion of a vibration attenuation period of said elastic body and applying the driving signal to said piezoelectric element, thereby generating an extending/contracting vibration along a longitudinal direction of said elastic body and a bending vibration propagating in the longitudinal direction of the elastic body.

24. The ultrasonic motor according to claim 23, further comprising input means for setting a shape of the envelope of the burst wave, wherein said driving circuit generates the driving signal consisting of the burst wave having the envelope set by said input means.

25. The ultrasonic motor according to claim 23, wherein said driving circuit applies the driving signal to the piezoelectric element until the amplitude of the burst wave decreases to a predetermined level.

26. The ultrasonic motor according to claim 25, further comprising input means for setting a shape of the envelope of the burst wave, wherein said driving circuit generates the driving signal consisting of the burst wave having the envelope set by said input means.

27. A method of driving an ultrasonic motor in which a piezoelectric element is driven to generate an extending/contracting vibration along a longitudinal direction of an elastic body and a bending vibration propagating in the longitudinal direction of the elastic body, wherein a driving signal consisting of a burst wave is applied to said piezoelectric element, thereby exciting and vibrating the elastic body, and a driving signal consisting of a burst wave with an envelope having attenuation characteristics is applied to said piezoelectric element in a vibration attenuation period after the elastic body is excited and vibrated.

* * * * *